United States Patent
Otani et al.

(10) Patent No.: US 10,018,710 B2
(45) Date of Patent: Jul. 10, 2018

(54) OBJECT DETECTION DEVICE

(71) Applicants: Naoki Otani, Aichi (JP); Hidenori Miyazaki, Aichi (JP); Hoshibumi Ichiyanagi, Aichi (JP)

(72) Inventors: Naoki Otani, Aichi (JP); Hidenori Miyazaki, Aichi (JP); Hoshibumi Ichiyanagi, Aichi (JP)

(73) Assignee: OMRON AUTOMOTIVE ELECTRONICS CO., LTD., Aichi (JP)

(*) Notice: Subject to any disclaimer, the term of this patent is extended or adjusted under 35 U.S.C. 154(b) by 0 days.

(21) Appl. No.: 15/829,439

(22) Filed: Dec. 1, 2017

(65) Prior Publication Data
US 2018/0156938 A1 Jun. 7, 2018

(30) Foreign Application Priority Data
Dec. 2, 2016 (JP) ................................. 2016-235466

(51) Int. Cl.
*G01S 7/481* (2006.01)
*G01S 17/02* (2006.01)
(Continued)

(52) U.S. Cl.
CPC .............. *G01S 7/481* (2013.01); *G01B 11/14* (2013.01); *G01C 3/08* (2013.01); *G01S 7/4812* (2013.01);
(Continued)

(58) Field of Classification Search
CPC ... G01V 8/10; G01V 8/12; G01V 8/13; G01V 8/16; G01V 8/18; G01V 8/20; G01V 8/22;
(Continued)

(56) References Cited

U.S. PATENT DOCUMENTS 3,214,596 A * 10/1965 Schwerdt, Jr. ........ G01S 17/026
250/239
5,225,882 A * 7/1993 Hosokawa .............. G01S 17/42
356/5.06
(Continued)

FOREIGN PATENT DOCUMENTS

DE 102014110510 A1 1/2016
JP 2003-149338 A 5/2003
(Continued)

*Primary Examiner* — Gordon J Stock, Jr.
(74) *Attorney, Agent, or Firm* — Osha Liang LLP (57) ABSTRACT

An object detection device includes a first substrate with a laser diode thereon; a second substrate with a photodiode thereon; a holding member holding the first and second substrates; an optical deflector deflecting light projected from the LD to irradiate a target with the deflected light, and deflects light reflected off the target; and a reflecting mirror guiding the reflected light deflected by the optical deflector to the PD. The LD is mounted on a mounting surface of the first substrate to project light mainly in a direction parallel to the mounting surface. The PD is mounted on a mounting surface of the second substrate to receive light coming mainly in a direction perpendicular to the mounting surface. The holding member parallelly holds the first and second substrates such that projection planes of the first and second substrates perpendicular to the mounting surfaces overlap each other.

6 Claims, 10 Drawing Sheets

(51) Int. Cl.
 *G01C 3/08* (2006.01)
 *G01B 11/14* (2006.01)
 *G01V 8/10* (2006.01)

(52) U.S. Cl.
 CPC .......... *G01S 7/4813* (2013.01); *G01S 17/02* (2013.01); *G01S 17/026* (2013.01); *G01V 8/10* (2013.01)

(58) Field of Classification Search
 CPC ... G01V 8/24; G01V 8/26; G01C 3/00; G01C 3/02; G01C 3/04; G01C 3/06; G01C 3/08; G01C 3/12; G03B 13/20; G01S 17/00; G01S 17/02; G01S 17/026; G01S 17/06; G01S 17/08; G01S 17/42; G01S 17/46; G01S 17/50; G01S 17/66; G01S 17/88; G01S 17/93; G01S 17/933; G01S 17/936; G01S 7/48; G01S 7/481; G01S 7/4811; G01S 7/4812; G01S 7/4813; G01S 7/4814; G01S 7/4815; G01S 7/4816; G01S 7/4817; G01B 11/00; G01B 11/002; G01B 11/005; G01B 11/14
 See application file for complete search history.

(56) References Cited

U.S. PATENT DOCUMENTS

| | | | |
|---|---|---|---|
| 6,671,037 B2 | 12/2003 | Isogai et al. | |
| 6,956,227 B2* | 10/2005 | Miyazaki | G01S 7/4972 250/559.38 |
| 9,157,998 B2* | 10/2015 | Itao | G01S 17/88 |
| 9,188,674 B2* | 11/2015 | Suzuki | G01S 7/4817 |
| 9,304,228 B2 | 4/2016 | Nakamura et al. | |
| 9,568,358 B2 | 2/2017 | Nakamura et al. | |
| 9,804,385 B2* | 10/2017 | Itami | G02B 26/12 |
| 2007/0076186 A1* | 4/2007 | Miyazaki | G01S 17/42 356/3.1 |
| 2011/0235018 A1* | 9/2011 | Mori | G01C 3/08 356/5.01 |
| 2014/0078489 A1 | 3/2014 | Hoashi | |
| 2015/0204977 A1 | 7/2015 | Sakai | |
| 2015/0309175 A1* | 10/2015 | Hinderling | G01S 7/4813 356/4.01 |
| 2016/0245919 A1* | 8/2016 | Kalscheur | G01S 17/89 |
| 2017/0153319 A1* | 6/2017 | Villeneuve | G01S 7/4804 |
| 2017/0219696 A1* | 8/2017 | Hayakawa | G01S 7/4812 |

FOREIGN PATENT DOCUMENTS

| | | |
|---|---|---|
| JP | 2014-032149 A | 2/2014 |
| JP | 2014-052366 A | 3/2014 |
| JP | 2014-059222 A | 4/2014 |
| JP | 2014-235075 A | 12/2014 |
| JP | 2015-137951 A | 7/2015 |
| WO | 2016/012579 A1 | 1/2016 |

* cited by examiner

OBJECT DETECTION DEVICE

CROSS-REFERENCE TO RELATED APPLICATION

This application is based on Japanese Patent Application No. 2016-235466 filed with the Japan Patent Office on Dec. 2, 2016, the entire contents of which are incorporated herein by reference.

FIELD

The disclosure relates to an object detection device that projects light from light emitting elements and detects a target based on a result of reflected light of the projected light that is received by light receiving elements.

BACKGROUND

For example, an object detection device such as a laser radar for vehicle mounting projects light from light emitting elements, and detects whether there is a target based on a result of reflected light of the projected light that is received by light receiving elements. In addition, there is also an object detection device that projects light from light emitting elements and detects a distance from the object detection device to a target, based on the time taken for light receiving elements to receive reflected light from the target.

For the light emitting elements, laser diodes, etc., are used. For the light receiving elements, photodiodes, etc., are used. For example, as described in JP 2003-149338 A, JP 2014-59222 A, JP 2014-52366 A, JP 2014-32149 A, JP 2014-235075 A, JP 2015-137951 A, WO 2016/012579 A, and DE 102014110510 A, light projected from light emitting elements passes through optical components of a light projection system such as a light projecting lens and a mirror, and is deflected by an optical deflector, and a target is irradiated with the deflected light. Then, light reflected off the target is deflected by the optical deflector, and then the deflected light passes through optical components of a light reception system such as a mirror and a light receiving lens, and is received by light receiving elements. Note that, in JP 2003-149338 A, reflected light from a target is collected by a light receiving lens without passing through an optical deflector, and is received by light receiving elements. The optical deflector is composed of, for example, a rotating mirror.

To project and receive light to/from a target, in JP 2003-149338 A, JP 2014-59222 A, JP 2014-32149 A, and DE 102014110510 A, light emitting elements and light receiving elements are mounted on different substrates. In JP 2014-235075 A, light emitting elements and light receiving elements are mounted on the same plate-like member (reference sign 1a). In all of JP 2003-149338 A, JP 2014-59222 A, JP 2014-32149 A, DE 102014110510 A, and JP 2014-235075 A, the light emitting elements are mounted on a mounting surface of the substrate so as to project light mainly in a direction perpendicular to the mounting surface. The light receiving elements are mounted on a mounting surface of the substrate so as to receive light coming mainly in a direction perpendicular to the mounting surface.

In addition, in JP 2003-149338 A, the substrate having mounted thereon the light emitting elements and the substrate having mounted thereon the light receiving elements are disposed in parallel to each other on the same plane. In JP 2014-59222 A and DE 102014110510 A, the substrate having mounted thereon the light emitting elements and the substrate having mounted thereon the light receiving elements are disposed perpendicularly to each other.

When the light emitting elements and the light receiving elements are mounted on different substrates, if one substrate and the other substrate are disposed side by side such that their substrate surfaces are located on the same plane, then the object detection device increases in size in a side-by-side disposition direction. Meanwhile, positioning two substrates such that their substrate surfaces are perpendicular to each other is more difficult than positioning two substrates such that their substrate surfaces are parallel to each other.

SUMMARY

An object of the disclosure is to easily position substrates of an object detection device in which light emitting elements and light receiving elements are mounted on different substrates, and to miniaturize the object detection device.

An object detection device of one or more embodiments of the disclosure includes a light emitting element; a first substrate on which the light emitting element is mounted; a light receiving element; a second substrate on which the light receiving element is mounted; a holding member configured to hold the first substrate and the second substrate; an optical deflector configured to deflect projected light to irradiate a target with the deflected light, and deflect reflected light, the projected light being projected from the light emitting element and the reflected light being reflected off the target; and a reflecting mirror configured to reflect the reflected light to guide the reflected light to the light receiving element, the reflected light being deflected by the optical deflector. The light emitting element is mounted on a mounting surface of the first substrate so as to project light mainly in a direction parallel to the mounting surface of the first substrate. The light receiving element is mounted on a mounting surface of the second substrate so as to receive light coming mainly in a direction perpendicular to the mounting surface of the second substrate. The holding member parallelly holds the first substrate and the second substrate such that a projection plane perpendicular to the mounting surface of the first substrate overlaps a projection plane perpendicular to the mounting surface of the second substrate.

According to the above description, the light emitting element mounted on the first substrate projects light mainly in a direction parallel to the mounting surface of the first substrate, the optical deflector deflects the projected light, and a target is irradiated with the deflected light. Then, the optical deflector deflects reflected light that is reflected off the target, and thereafter, the reflecting mirror reflects the deflected light in a direction perpendicular to the second substrate, and the light receiving element mounted on the second substrate receives the reflected light. Hence, even if the light emitting element projects light in a direction parallel to the mounting surface of the first substrate, by the deflection of the light, the light receiving element can receive light reflected off the target, enabling to detect an object. In addition, in one or more embodiments of the disclosure, the light emitting element and the light receiving element are disposed such that the main light projection direction of light projected from the light emitting element is perpendicular to the main light reception direction of light received by the light receiving element. To do so, the holding member holds the first substrate having mounted thereon the light emitting element and the second substrate having mounted thereon the light receiving element such that both mounting surfaces, i.e., substrate surfaces, are parallel to each other. Hence, the first substrate and the second substrate can be easily positioned compared with a case in which the first substrate and the second substrate are positioned such that their substrate surfaces are perpendicular to each other. Furthermore, the first and second substrates are disposed such that projection planes perpendicular to the mounting surfaces of the first and second substrates overlap each other. Hence, comparing with a case in which the first and second substrates are disposed side by side such that their substrate surfaces are located on the same plane, the object detection device can be miniaturized by an amount corresponding to an overlapping portion between the projection planes.

In one or more embodiments of the disclosure, the holding member may hold the first substrate on an object side with respect to the second substrate.

In addition, in one or more embodiments of the disclosure, the optical deflector and the reflecting mirror may be disposed on the target side with respect to the second substrate, the optical deflector may deflect the projected light from the light emitting element, to the target side of the first substrate and deflect the reflected light from the target mainly in a direction parallel to the first and second substrates, and the reflecting mirror may reflect the reflected light in a direction perpendicular to the second substrate, the reflected light being deflected by the optical deflector.

In addition, in one or more embodiments of the disclosure, the holding member may also hold the reflecting mirror.

In addition, in one or more embodiments of the disclosure, the object detection device may further include a controller configured to control operation of the light emitting element, the light receiving element, and the optical deflector, and detect the target based on a light reception signal outputted from the light receiving element, and the controller may be mounted on the second substrate.

Furthermore, in one or more embodiments of the disclosure, the first substrate may be smaller in area than the second substrate, and the first substrate and the second substrate may be disposed such that the projection plane perpendicular to the mounting surface of the first substrate is placed within the projection plane perpendicular to the mounting surface of the second substrate.

According to one or more embodiments of the disclosure, in an object detection device in which a light emitting element and a light receiving element are mounted on different substrates, the substrates can be easily positioned and the object detection device can be miniaturized.

DETAILED DESCRIPTION

An embodiment of one or more embodiments of the disclosure will be described below with reference to the drawings. In the drawings, the same or corresponding portions are denoted by the same reference signs. In embodiments of the disclosure, numerous specific details are set forth in order to provide a more through understanding of the invention. However, it will be apparent to one of ordinary skill in the art that the invention may be practiced without these specific details. In other instances, well-known features have not been described in detail to avoid obscuring the invention.

First, an electrical configuration of an object detection device 100 of an embodiment will be described with reference to FIG. 1.

Figure 1:
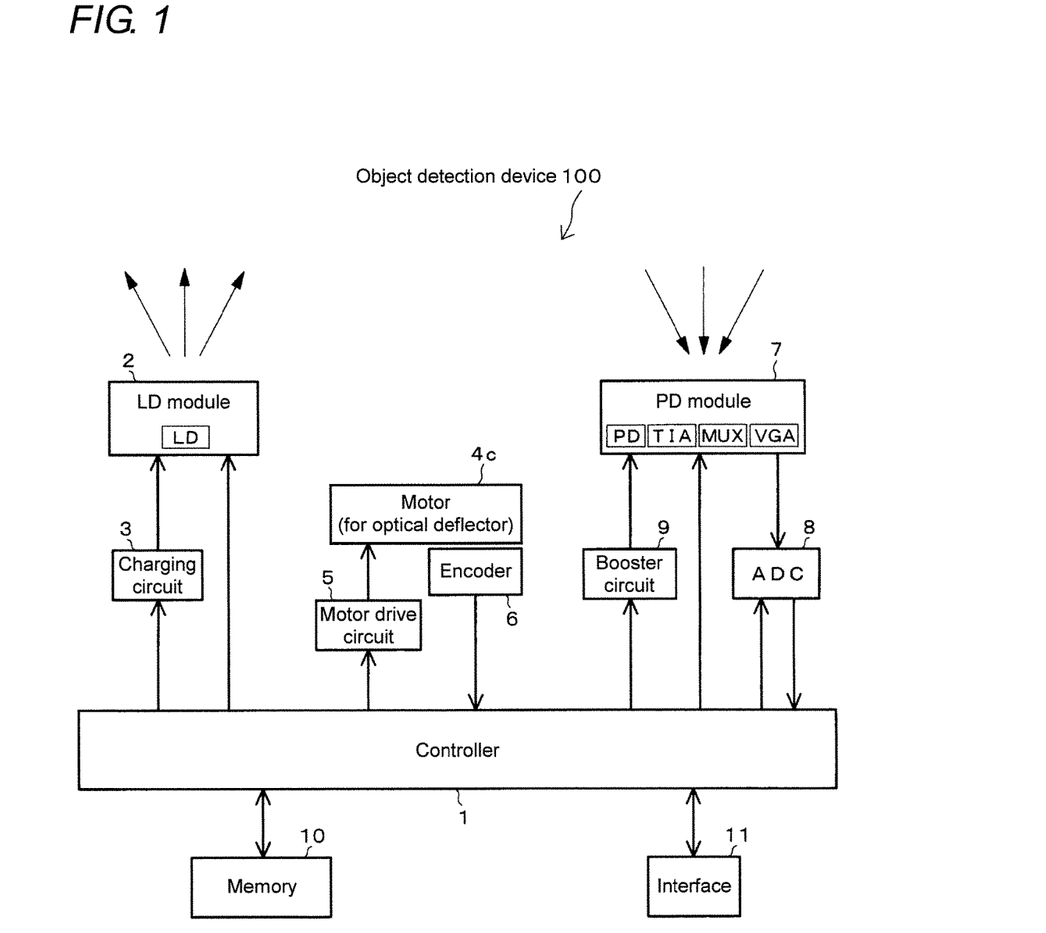
FIG. 1 is an electrical configuration diagram of an object detection device of one or more embodiments of the disclosure.

FIG. 1 is an electrical configuration diagram of the object detection device 100. The object detection device 100 is a laser radar for vehicle mounting. A controller 1 is composed of a CPU, etc., and controls the operation of each unit of the object detection device 100.

A laser diode (LD) module 2 is packaged. The LD module 2 includes a plurality of (e.g., 4 channels) laser diodes (LDs) which are light sources. Each LD is a light emitting element that emits a high-power optical pulse. A charging circuit 3 is connected to the LD module 2.

The controller 1 controls the operation of each LD in the LD module 2. Specifically, for example, the controller 1 allows each LD to emit light to project light onto a target such as a person or an object. In addition, the controller 1 allows each LD to stop light emission to charge the LD by the charging circuit 3.

A motor 4c is a drive source for an optical deflector 4 (FIG. 3, etc.) which will be described later. A motor drive circuit 5 drives the motor 4c. An encoder 6 detects a rotation state (an angle, the number of rotations, etc.) of the motor 4c. The controller 1 allows the motor drive circuit 5 to rotate the motor 4c to control the operation of the optical deflector 4. In addition, the controller 1 detects an operating state (the amount of operation, an operating position, etc.) of the optical deflector 4, based on an output from the encoder 6.

A photodiode (PD) module 7 is packaged. The PD module 7 includes PDs which are light receiving elements, a transimpedance amplifier (TIA), a multiplexer (MUX), and a variable gain amplifier (VGA) (detailed circuits are not shown).

Plural (e.g., 32 channels) PDs are provided in the PD module 7. The MUX inputs an output signal from the TIA to the VGA. A booster circuit 9 supplies a boosted voltage which is required for the operation of the photodiodes, to each PD in the PD module 7. An analog-to-digital converter (ADC) 8 converts an analog signal outputted from the PD module 7 into a digital signal.

The controller 1 controls the operation of each unit of the PD module 7. Specifically, for example, the controller 1 allows the LDs in the LD module 2 to emit light, by which the PDs in the PD module 7 receive light reflected off a target. Then, the controller 1 allows the TIA and VGA in the PD module 7 to perform signal processing on a light reception signal which is outputted from the PDs according to a light reception state of the received light. Furthermore, the controller 1 allows the ADC 8 to convert the analog light reception signal outputted from the PD module 7 into a digital light reception signal, and detects whether there is a target, based on the digital light reception signal. In addition, the controller 1 calculates a period of time from when the LDs emit light until the PDs receive light reflected off the target, and detects a distance from the object detection device 100 to the target, based on the period of time.

A memory 10 is composed of a volatile or nonvolatile memory. In the memory 10 are stored, for example, information for controlling each unit of the object detection device 100 by the controller 1 and information for detecting a target. An interface 11 is composed of a communication circuit such as Ethernet (registered trademark). The controller 1 transmits/receives information about a target or transmits/receives various types of control information to/from an electronic control unit (ECU) mounted on a vehicle, using the interface 11.

Next, the structure and function of the object detection device 100 will be described with reference to FIGS. 2 to 10.

Figure 2:
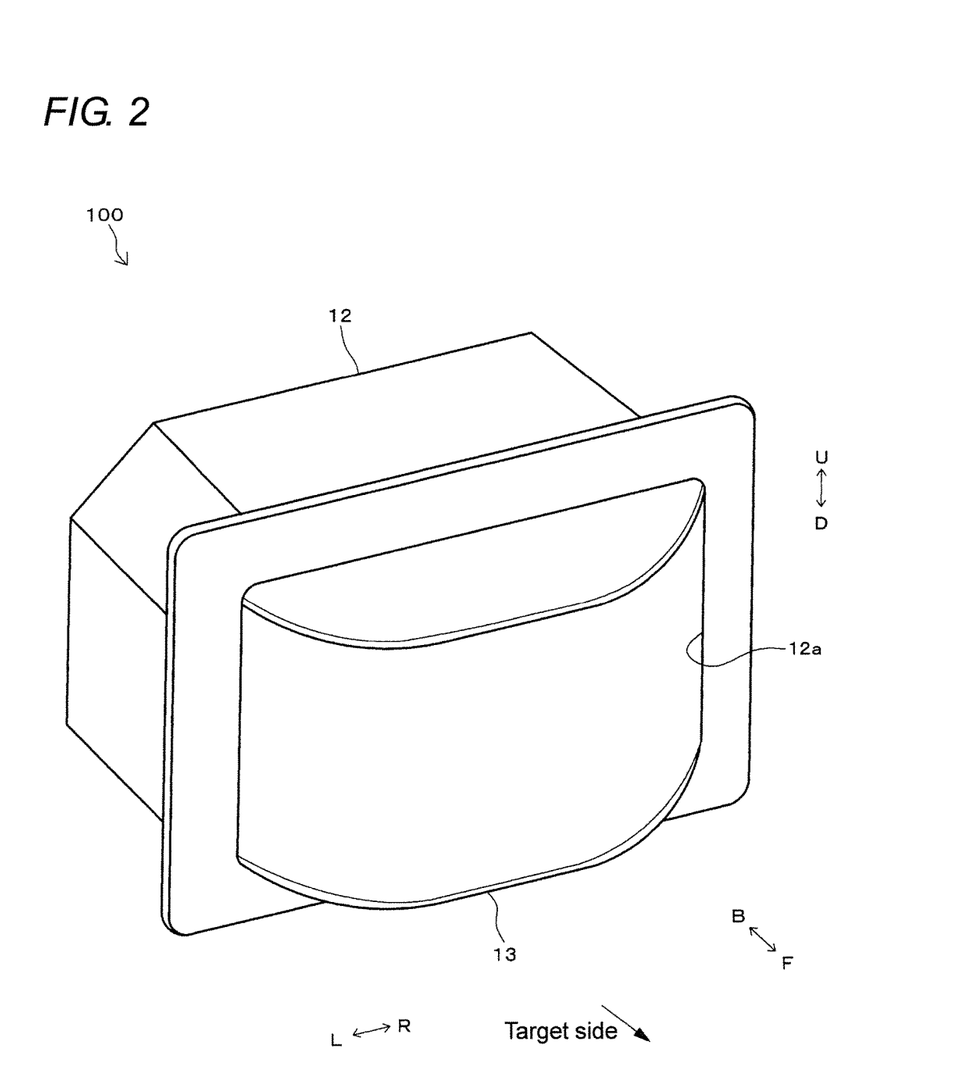
FIG. 2 is a perspective view showing an external appearance of the object detection device of FIG. 1.
Figure 3:
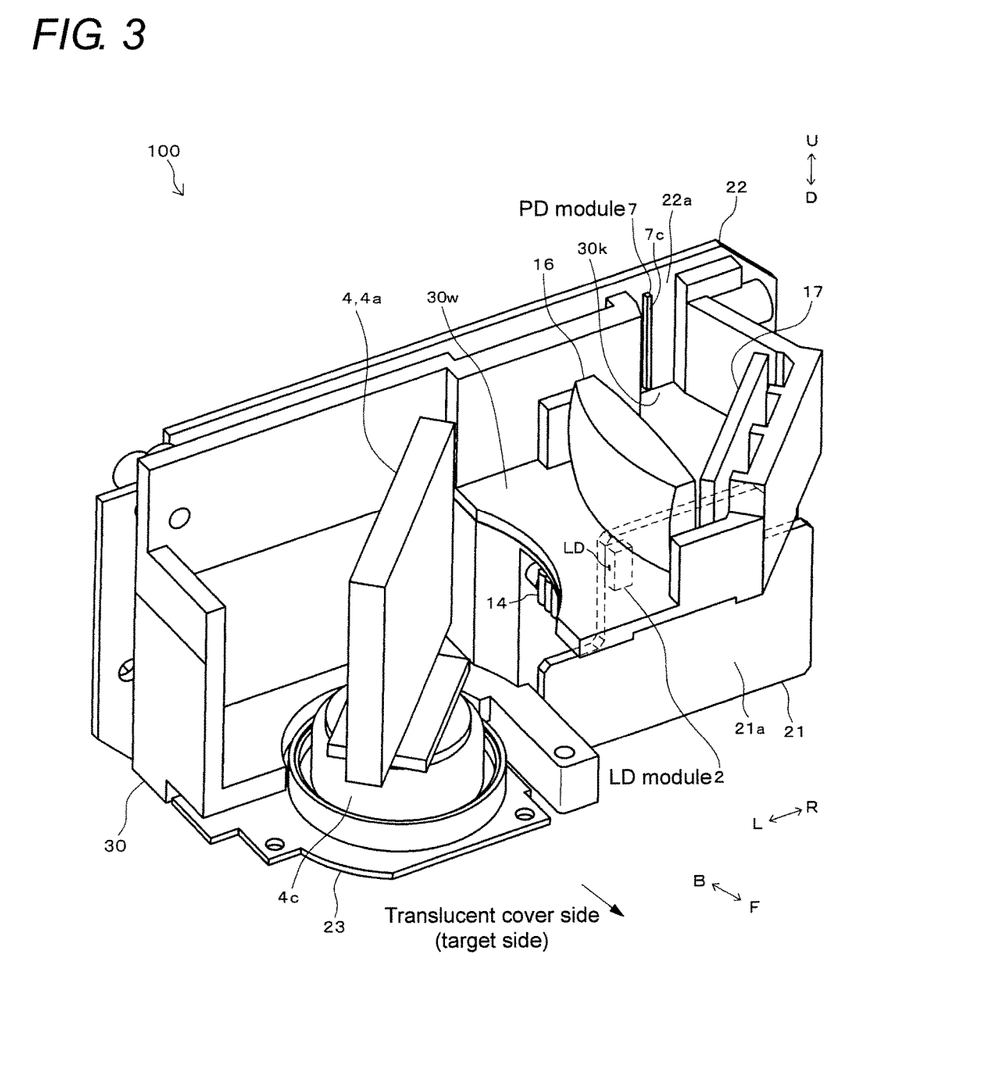
FIG. 3 is a perspective view showing an internal structure of the object detection device of FIG. 1.
Figure 4:
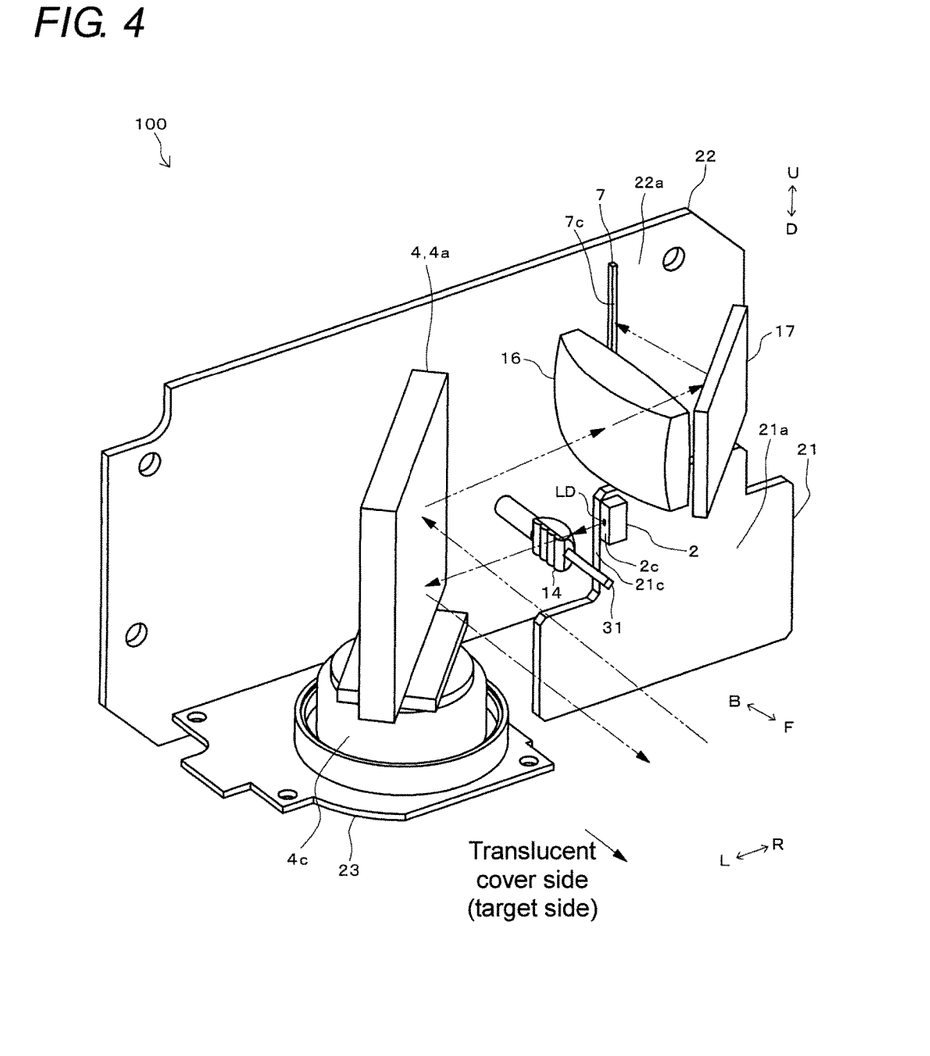
FIG. 4 is a diagram showing a state in which a holding member is omitted from FIG. 3.
Figure 5:
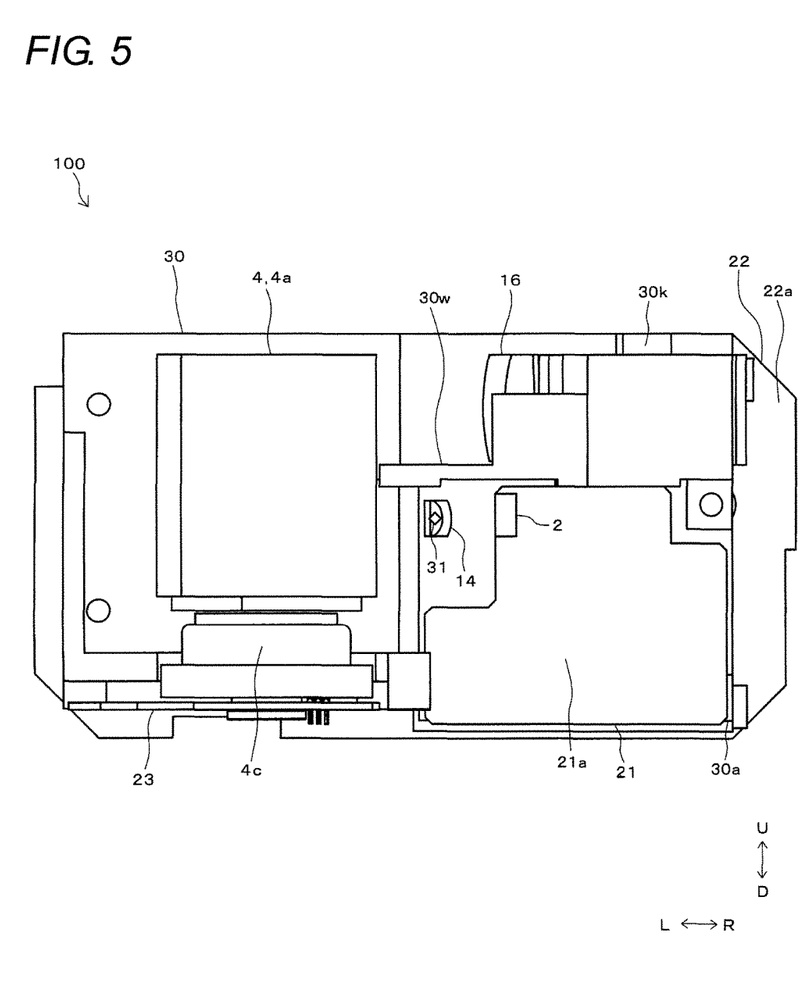
FIG. 5 is a front view showing the internal structure of the object detection device of FIG. 1.
Figure 6:
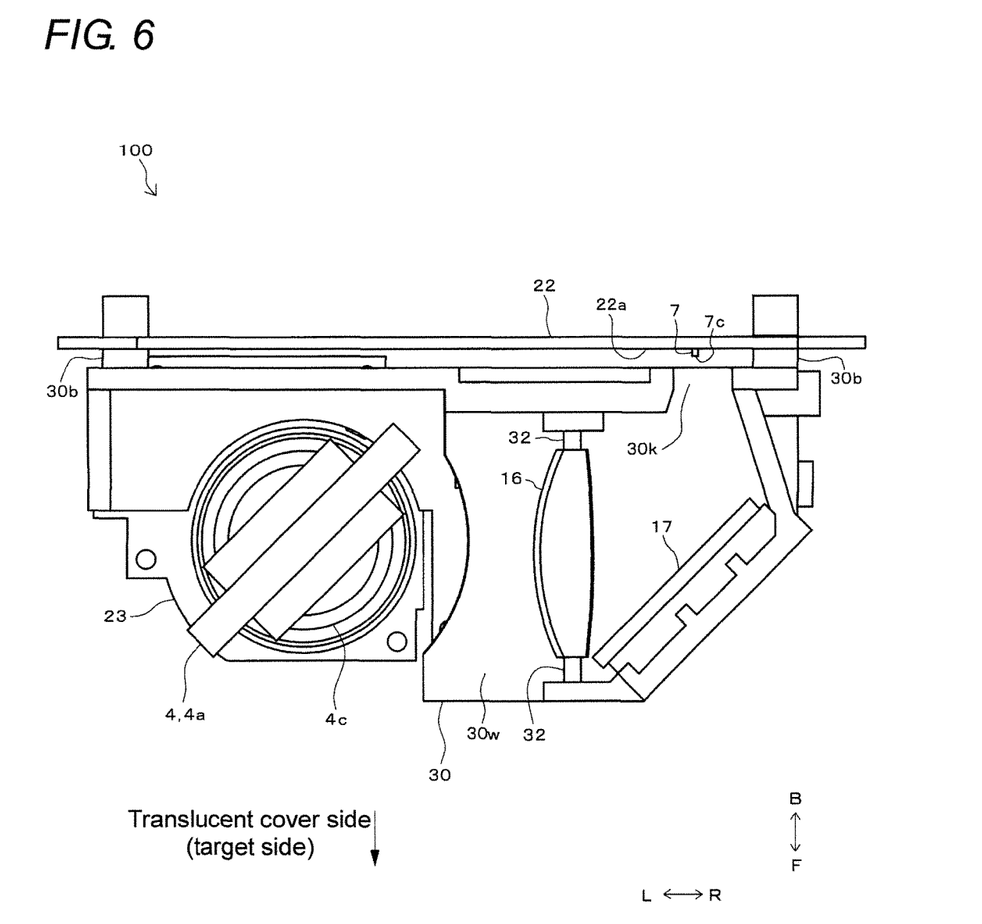
FIG. 6 is a plan view showing the internal structure of the object detection device of FIG. 1.
Figure 7:
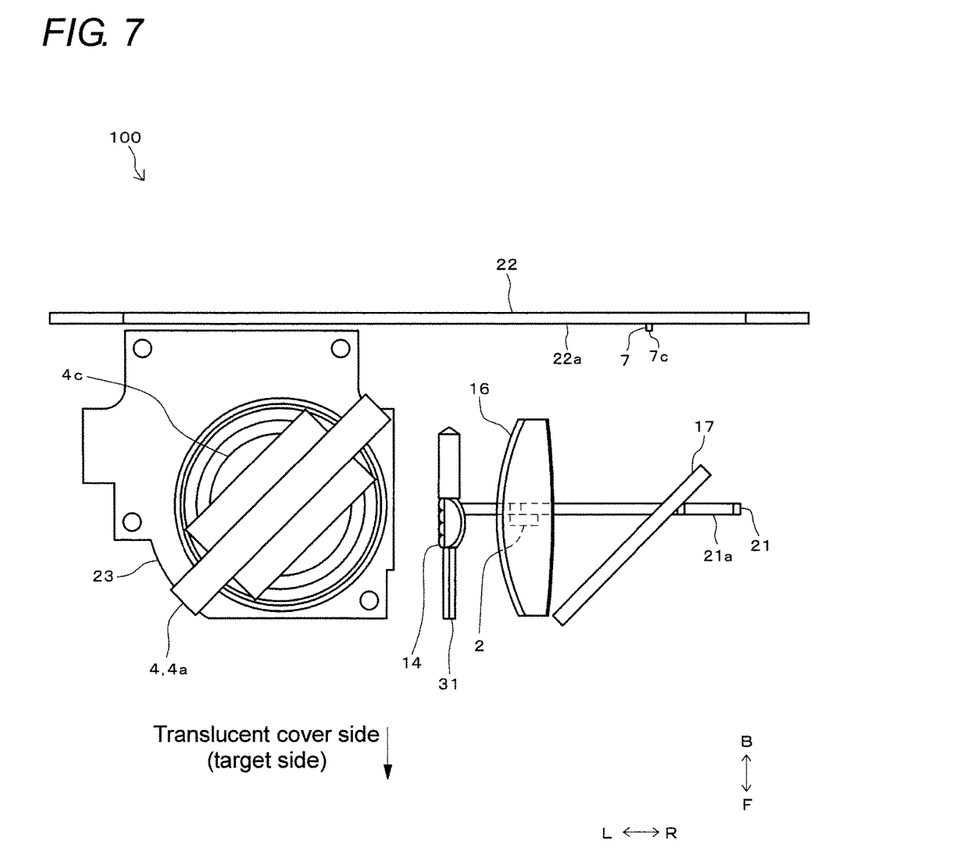
FIG. 7 is a diagram showing a state in which the holding member is omitted from FIG. 6.
Figure 8:
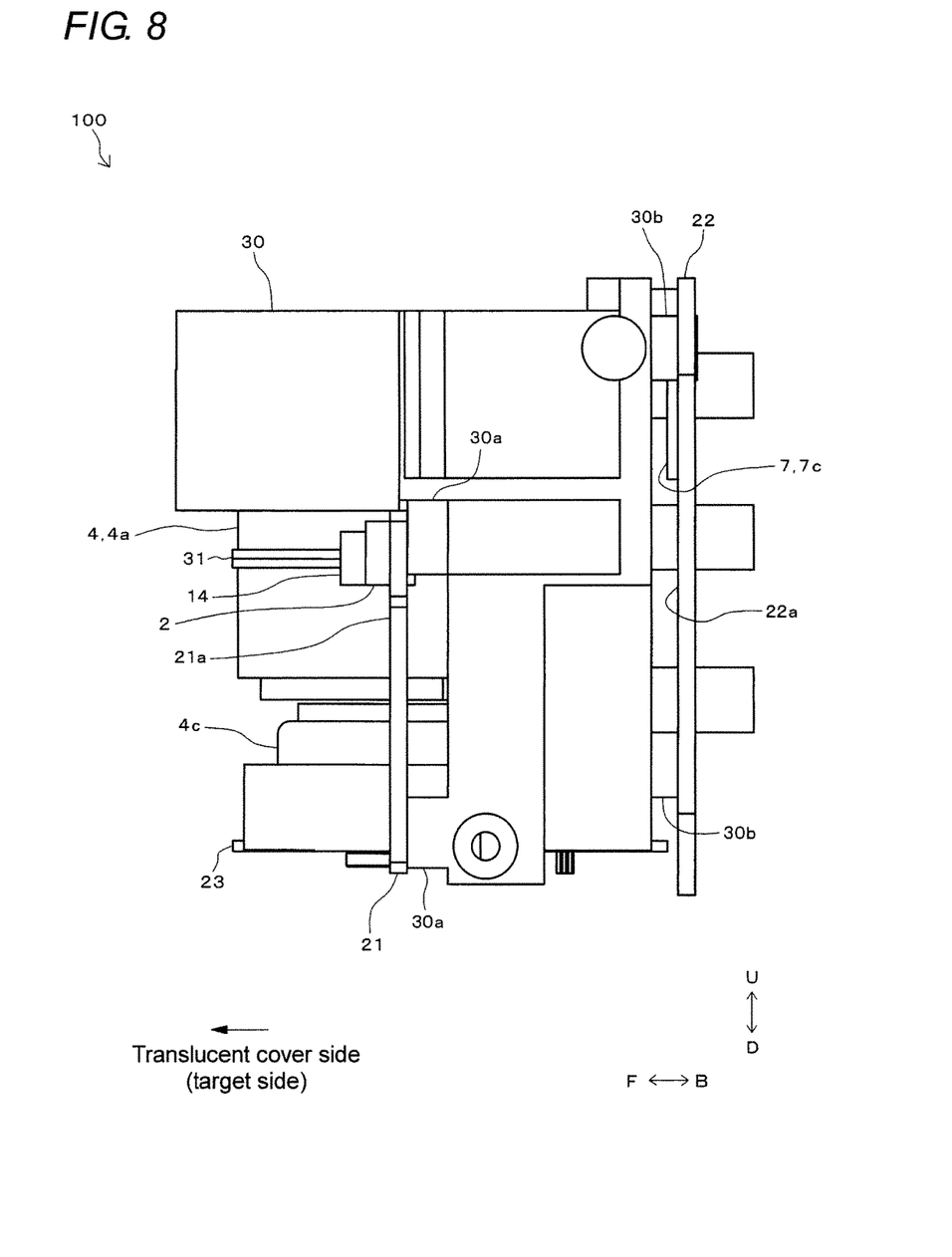
FIG. 8 is a side view showing the internal structure of the object detection device of FIG. 1.
Figure 9:
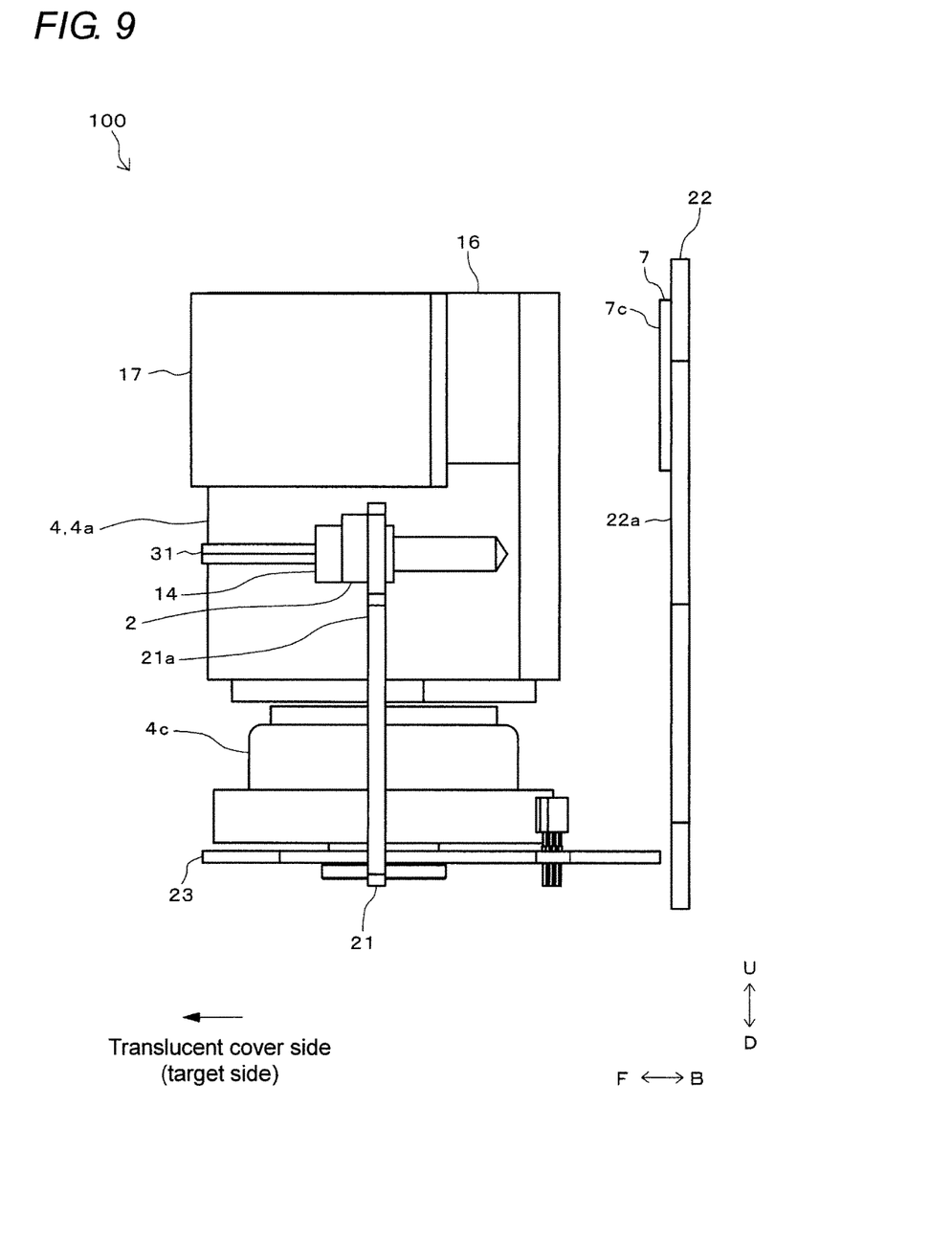
FIG. 9 is a diagram showing a state in which the holding member is omitted from FIG. 8.

FIG. 2 is a perspective view showing an external appearance of the object detection device 100. FIGS. 3 to 9 are diagrams showing an internal structure of the object detection device 100. Specifically, FIG. 3 is a perspective view showing the internal structure of the object detection device 100. FIG. 4 is a diagram showing a state in which a holding member 30 is omitted from FIG. 3. FIG. 5 is a front view showing the internal structure of the object detection device 100. FIG. 6 is a plan view showing the internal structure of the object detection device 100. FIG. 7 is a diagram showing a state in which the holding member 30 is omitted from FIG. 6. FIG. 8 is a side view showing the internal structure of the object detection device 100. FIG. 9 is a diagram showing a state in which the holding member 30 is omitted from FIG. 8.

As shown in FIG. 2, a case 12 of the object detection device 100 is a rectangular box as viewed from the front. An opening 12a of the case 12 is covered by a translucent cover 13. The translucent cover 13 is formed in a dome shape with a predetermined thickness.

An internal space enclosed by the case 12 and the translucent cover 13 accommodates an optical system such as that shown in FIGS. 3 to 9, an electrical system shown in FIG. 1, etc. The translucent cover 13 of FIG. 2 allows light to pass through the inside and outside of the case 12.

The object detection device 100 is installed, for example, at the front, rear, or left and right sides of a vehicle such that the translucent cover 13 faces the front, rear, or left and right sides of the vehicle. At that time, as shown in FIG. 2, the object detection device 100 is installed on the vehicle such that a short-side direction of the case 12 is oriented in up and down direction U, D.

As shown in FIGS. 3 to 9, the optical system accommodated in the internal space formed by the case 12, etc., includes the LDs in the LD module 2, a light projecting lens 14, the optical deflector 4, a light receiving lens 16, a reflecting mirror 17, and the PDs in the PD module 7.

Of the above-described components, the LDs in the LD module 2, the light projecting lens 14, and the optical deflector 4 form a projection optical system. In addition, the optical deflector 4, the light receiving lens 16, the reflecting mirror 17, and the PDs in the PD module 7 form a light receiving optical system.

As shown in FIG. 4, etc., the LD module 2 is formed in a thin rectangular-parallelepiped form. Light emitting portions of the plural LDs (a portion denoted by reference sign LD in FIG. 4) are exposed from one side surface 2c of the LD module 2. Each LD projects light (high-power optical pulse).

As shown in FIGS. 3 to 5, the LD module 2 is mounted on an edge of one mounting surface 21a of a first substrate 21. The LD module 2 is disposed at a central portion of the object detection device 100. The light emitting portion of each LD in the LD module 2 faces the center side of the object detection device 100 and in a direction L parallel to the mounting surface 21a of the first substrate 21. Hence, each LD projects light mainly in the direction L parallel to the mounting surface 21a.

As shown in FIG. 4, the one side surface 2c of the LD module 2 is flush with one side surface 21c of the first substrate 21. By this, light emitted from each LD in the LD module 2 is prevented from being blocked by the first substrate 21.

As shown in FIGS. 3, 5, and 8, the first substrate 21 is held by the holding member 30. Specifically, the first substrate 21 is fixed with fixing members, such as screws, to a first holder 30a provided at the front (the translucent cover 13 side) of the holding member 30. The mounting surface 21a of the first substrate 21 faces the translucent cover 13 side, i.e., the target side. The holding member 30 is fixed within the case 12 with fixing members.

The light projecting lens 14 is disposed on the light-emitting direction side of the LD module 2. The light projecting lens 14 is held by the holding member 30 through a support rod 31. The light projecting lens 14 adjusts the spread of light emitted from each LD in the LD module 2.

As shown in FIGS. 3, 4, 9, etc., the PD module 7 is formed in a rectangular rod shape. One side surface 7c of the PD module 7 has light receiving portions of the plural PDs arranged in a row in the up and down direction U, D (details are not shown).

The PD module 7 is mounted on one mounting surface 22a of a second substrate 22. Each PD in the PD module 7 faces the translucent cover 13 side and in a direction F perpendicular to the mounting surface 22a of the second substrate 22. Hence, each PD receives light coming mainly in a direction B perpendicular to the mounting surface 22a (the opposite direction to the F direction).

As shown in FIGS. 3, 6, and 8, etc., the second substrate 22 is held by the holding member 30. Specifically, the second substrate 22 is fixed with fixing members to a second holder 30b provided at the rear (the opposite side of the translucent cover 13) of the holding member 30. The mounting surface 22a of the second substrate 22 faces the translucent cover 13 side, i.e., the target side.

As shown in FIGS. 3 and 6, the PD module 7 is exposed from an opening 30k provided at the top of the holding member 30. Namely, the light receiving portions of the PDs in the PD module 7 can be looked out from the target side through the opening 30k.

As shown in FIGS. 7 to 9, the holding member 30 parallelly holds the first substrate 21 and the second substrate 22 with a predetermined spacing provided therebetween in a substrate thickness direction of the first and second substrates 21 and 22. In addition, the holding member 30 holds the first substrate 21 on the target side with respect to the second substrate 22.

Figure 10:
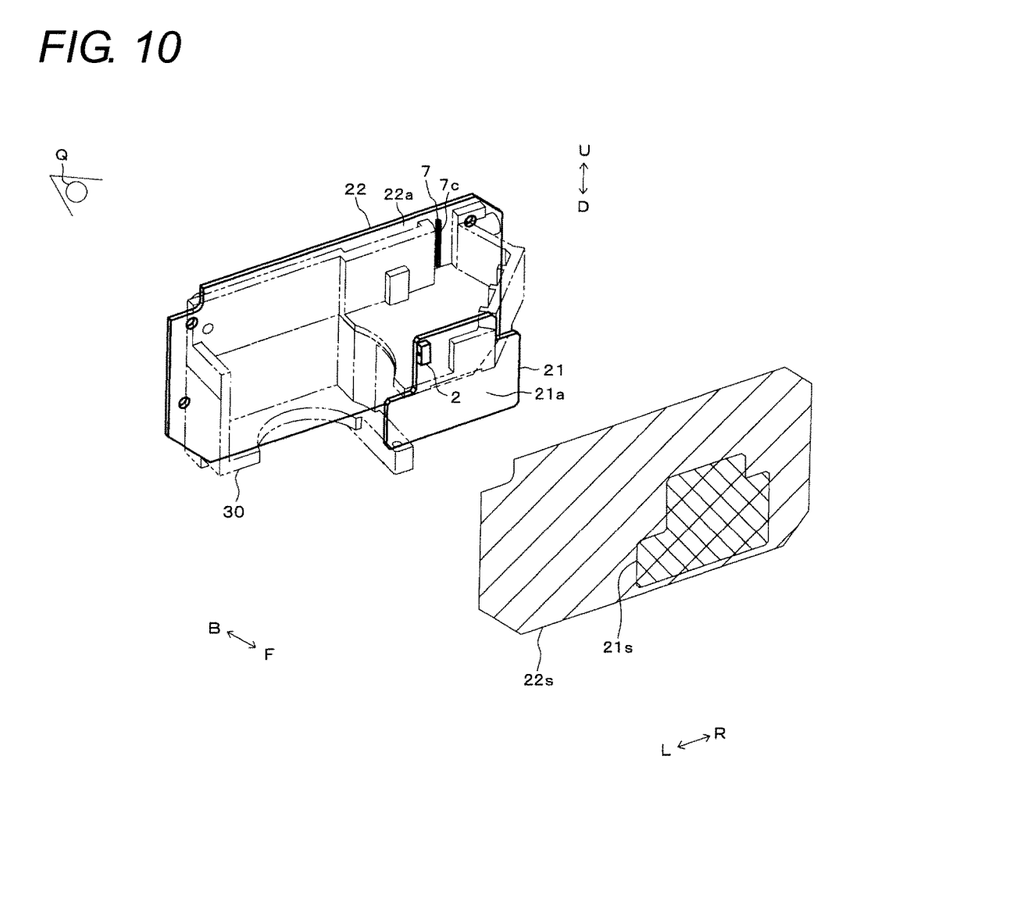
FIG. 10 is a diagram showing a projected state of a first substrate and a second substrate of FIG. 3.

FIG. 10 is a diagram showing a projected state of the first substrate 21 and the second substrate 22. In FIG. 10, components other than the first and second substrates 21 and 22 and the holding member 30 are not shown. As shown in FIG. 10, the first substrate 21 and the second substrate 22 are projected by a virtual light source Q in the F direction perpendicular to the mounting surfaces 21a and 22a. In this case, the first and second substrates 21 and 22 are held by the holding member 30 such that a projection plane 21s perpendicular to the mounting surface 21a of the first substrate 21 overlaps a projection plane 22s perpendicular to the mounting surface 22a of the second substrate 22.

The first substrate 21 is formed so as to be smaller in area than the second substrate 22. The first substrate 21 and the second substrate 22 are disposed such that the projection plane 21s perpendicular to the mounting surface 21a of the first substrate 21 is placed within the projection plane 22s perpendicular to the mounting surface 22a of the second substrate 22.

On the first substrate 21 there is mounted a part of the charging circuit 3 shown in FIG. 1, in addition to the LD module 2. On the second substrate 22 larger in size than the first substrate 21 there are mounted, for example, the ADC 8, the booster circuit 9, the other part of the charging circuit 3, the motor drive circuit 5, the controller 1, the memory 10, and the interface 11 which are shown in FIG. 1, in addition to the PD module 7. The first substrate 21 and the second substrate 22 are electrically connected to each other by connectors or flexible printed circuits (FPCs) which are not shown.

As shown in FIGS. 3, 4, and 7, the light projecting lens 14, the optical deflector 4, the light receiving lens 16, and the reflecting mirror 17 are disposed on the more target side than the second substrate 22.

The optical deflector 4 is also called a rotating mirror, and includes a double-sided mirror 4a, a motor 4c, etc. The motor 4c is mounted on a third substrate 23. The third substrate 23 is fixed within the case 12 with a fixing member such that a rotating shaft (not shown) of the motor 4c is parallel to the U, D direction. As another example, the third substrate 23 may be held by the holding member 30.

A substrate surface of the third substrate 23 is perpendicular to the substrate surfaces of the first substrate 21 and the second substrate 22. The third substrate 23 and the second substrate 22 are electrically connected to each other by connectors or FPCs which are not shown. The third substrate 23 is formed so as to be smaller in area than the second substrate 22. The third substrate 23 is disposed within the projection plane 22s perpendicular to the mounting surface 22a of the second substrate 22 (not shown).

The double-sided mirror 4a is connected to one end (an upper end in FIGS. 3 to 5, etc.) of the rotating shaft of the motor 4c. The double-sided mirror 4a rotates in conjunction with the rotating shaft of the motor 4c.

The light receiving lens 16 and the reflecting mirror 17 are disposed above the first substrate 21 (FIG. 4). As shown in FIG. 6, the light receiving lens 16 is held by the holding member 30 through a support rod 32 such that a light entering surface (convex surface) faces the optical deflector 4. The light receiving lens 16 is composed of a condenser lens.

The reflecting mirror 17 is disposed on the opposite side of the light receiving lens 16 from the optical deflector 4. The reflecting mirror 17 is held by the holding member 30 so as to be inclined at a predetermined angle with respect to the light receiving lens 16 and the light receiving portions of the PDs in the PD module 7.

As indicated by a dashed-dotted-line arrow in FIG. 4, projected light which is projected from the LDs in the LD module 2 is adjusted its spread by the light projecting lens 14 and then hits a lower half portion of the double-sided mirror 4a of the optical deflector 4. Then, the projected light is deflected by the lower half portion of the double-sided mirror 4a and passes through the translucent cover 13 (FIG. 2), and a target is irradiated with the light. That is, the optical deflector 4 deflects the projected light from the LDs in the LD module 2, to the target side of the first substrate 21. At that time, the angle (orientation) of the double-sided mirror 4a is changed by the rotation of the motor 4c, by which the light emitted from the LDs is scanned in a range of a predetermined angle within an LR-FB plane outside the translucent cover 13.

As described above, the projected light having passed through the translucent cover 13 is reflected off a target such as a person or an object. The reflected light passes through the translucent cover 13. Thereafter, as indicated by a dashed-double-dotted-line arrow in FIG. 4, the reflected light is deflected by an upper half portion of the double-sided mirror 4a of the optical deflector 4 and enters the light receiving lens 16. At that time, the angle (orientation) of the double-sided mirror 4a is changed by the rotation of the motor 4c, by which the light reflected off the target that comes in the range of the predetermined angle within the LR-FB plane outside the translucent cover 13 is received by the double-sided mirror 4a and deflected to the light receiving lens 16. That is, the optical deflector 4 deflects the reflected light from the target mainly in a direction R parallel to the first and second substrates 21 and 22.

The reflected light having entered the light receiving lens 16 via the optical deflector 4 is collected by the light receiving lens 16 and is thereafter reflected off the reflecting mirror 17 and received by the PDs in the PD module 7. That is, the reflecting mirror 17 reflects the reflected light that is deflected by the optical deflector 4, in the direction B perpendicular to the second substrate 22.

A light reception signal outputted from the PDs according to a light reception state of the above-described reflected light is subjected to signal processing by the PD module 7 and the ADC 8. Then, based on the processed light reception signal, the controller 1 detects whether there is a target, and calculates a distance from the object detection device 100 to the target.

To separate a light projection path and a light reception path of the above-described light, a partition 30w (FIG. 3) is formed in the holding member 30.

According to the above embodiment, the LDs in the LD module 2 mounted on the first substrate 21 project light mainly in the direction L parallel to the mounting surface 21a of the first substrate 21, the optical deflector 4 deflects the projected light, and a target is irradiated with the deflected light. Then, the optical deflector 4 deflects reflected light that is reflected off the target, and then the reflecting mirror 17 reflects the deflected light in the direction B perpendicular to the second substrate 22, and the PDs in the PD module 7 mounted on the second substrate 22 receive the reflected light. Hence, even if the LDs in the LD module 2 project light in a direction parallel to the mounting surface 21a of the first substrate 21, by the deflection of the light, the PDs in the PD module 7 can receive light reflected off a target, enabling to detect an object.

In addition, in the above embodiment, the LD module 2 and the PD module 7 are disposed such that the main light projection direction L of light projected from the LD module 2 is perpendicular to the main light reception direction B of light received by the PD module 7. Hence, the holding member 30 holds the first substrate 21 having mounted thereon the LD module 2 and the second substrate 22 having mounted thereon the PD module 7 such that both the mounting surfaces 21a and 22a, i.e., substrate surfaces, are parallel to each other. Due to this, the first substrate 21 and the second substrate 22 can be easily positioned compared with a case in which the first substrate 21 and the second substrate 22 are positioned such that their substrate surfaces are perpendicular to each other.

In addition, in the above embodiment, the first substrate 21 and the second substrate 22 are disposed such that the projection planes 21s and 22s perpendicular to the mounting surfaces 21a and 22a of the first and second substrates 21 and 22 overlap each other. Hence, comparing with a case in which the first and second substrates 21 and 22 are disposed side by side such that their substrate surfaces are located on the same plane, the object detection device 100 can be miniaturized by an amount corresponding to an overlapping portion between the projection planes 21s and 22s.

In addition, in the above embodiment, the first substrate 21 is disposed on the target side and the second substrate 22 is disposed on the opposite side of the first substrate 21 from a target. Thus, a long light reception path of light from the target to the PDs on the second substrate 22 can be taken, and the light receiving lens 16 disposed in the light reception path can easily make an optical adjustment such as collection of reflected light from the target.

In addition, in the above embodiment, the light projecting lens 14, the optical deflector 4, and the reflecting mirror 17 are disposed on the target side with respect to the second substrate 22. Hence, a light projection path of light projected from the LDs and a light reception path of light from the target to the PDs can be formed on the target side with respect to the second substrate 22. In addition, by deflecting reflected light from the target mainly in the direction R parallel to the first and second substrates 21 and 22 by the optical deflector 4 and then reflecting the deflected light off the reflecting mirror 17 in the direction B perpendicular to the second substrate 22, the light reception path of light from the target to the PDs can be further increased.

In addition, in the above embodiment, the first and second substrates 21 and 22, the LD module 2, the PD module 7, and the reflecting mirror 17 are held by the holding member 30. Hence, by collectively attaching the first and second substrates 21 and 22, the LDs, the PDs, and the reflecting mirror 17 onto the holding member 30, they can be easily positioned, enabling to improve assembly properties.

In addition, in the above embodiment, an electrical system such as the controller 1 and other circuits 3, 5, 8, and 9 is mounted on the second substrate 22. Hence, components other than a light projection system do not need to be mounted on the first substrate 21, and accordingly, the first substrate 21 is miniaturized, enabling to secure wide space where a light projection path and a light reception path of light are disposed, on the target side of the second substrate 22.

Furthermore, in the above description, the first substrate 21 is smaller in area than the second substrate 22, and the first substrate 21 and the second substrate 22 are disposed such that the projection plane 21s perpendicular to the mounting surface 21a of the first substrate 21 is placed within the projection plane 22s perpendicular to the mounting surface 22a of the second substrate 22. Hence, by increasing the size of the second substrate 22, components other than the light projection system can be easily mounted on the second substrate 22. In addition, wider space where a light projection path and a light reception path of light are provided can be secured on the target side of the second substrate 22.

The disclosure can also adopt various embodiments in addition to the above-described one. For example, although the above embodiment shows an example in which one LD module 2 having four LDs and one PD module 7 having 32 PDs are provided, the disclosure is not limited thereto. The numbers of LD modules and PD modules installed may be two or more. In addition, the number of LDs or PDs in each module may be selected as appropriate.

In addition, although the above embodiment shows an example in which the first substrate 21 and the second substrate 22 are disposed such that the projection planes 21s and 22s perpendicular to the mounting surfaces 21a and 22a of the first and second substrates 21 and 22 completely overlap each other (FIG. 10), the first and second substrates 21 and 22 may be disposed such that the projection planes 21s and 22s partially overlap each other.

In addition, although the above embodiment shows an example in which the light reception path of light is provided above the light projection path of light, the disclosure is not limited thereto. Other than that, the light reception path of light may be provided beneath the light projection path of light.

Furthermore, although the above embodiment describes an example in which the disclosure is applied to the object detection device 100 for vehicle mounting, the disclosure can also be applied to object detection devices for other applications.

While the invention has been described with reference to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An object detection device comprising:
    a light emitting element;
    a first substrate on which the light emitting element is mounted;
    a light receiving element;
    a second substrate on which the light receiving element is mounted;
    a holding member configured to hold the first substrate and the second substrate;
    an optical deflector configured to deflect projected light to irradiate a target with the deflected light, and deflect reflected light, the projected light being projected from the light emitting element and the reflected light being reflected off the target; and
    a reflecting mirror configured to reflect the reflected light to guide the reflected light to the light receiving element, the reflected light being deflected by the optical deflector,
    wherein the light emitting element is mounted on a mounting surface of the first substrate so as to project light mainly in a direction parallel to the mounting surface of the first substrate,
    wherein the light receiving element is mounted on a mounting surface of the second substrate so as to receive light coming mainly in a direction perpendicular to the mounting surface of the second substrate, and
    wherein the holding member parallelly holds the first substrate and the second substrate such that a projection plane perpendicular to the mounting surface of the first substrate overlaps a projection plane perpendicular to the mounting surface of the second substrate.

2. The object detection device according to claim 1, wherein the holding member holds the first substrate on an object side with respect to the second substrate.

3. The object detection device according to claim 1,
wherein the optical deflector and the reflecting mirror are disposed on the target side with respect to the second substrate,
wherein the optical deflector deflects the projected light from the light emitting element, to the target side of the first substrate and deflects the reflected light from the target mainly in a direction parallel to the first and second substrates, and
wherein the reflecting mirror reflects the reflected light in a direction perpendicular to the second substrate, the reflected light being deflected by the optical deflector.

4. The object detection device according to claim 1, wherein the holding member also holds the reflecting mirror.

5. The object detection device according to claim 1, further comprising a controller configured to control operation of the light emitting element, the light receiving element, and the optical deflector, and detect the target based on a light reception signal outputted from the light receiving element,
wherein the controller is mounted on the second substrate.

6. The object detection device according to claim 1,
wherein the first substrate is smaller in area than the second substrate, and
wherein the first substrate and the second substrate are disposed such that the projection plane perpendicular to the mounting surface of the first substrate is placed within the projection plane perpendicular to the mounting surface of the second substrate.

* * * * *